(12) United States Patent
Wallace

(10) Patent No.: US 8,608,214 B2
(45) Date of Patent: Dec. 17, 2013

(54) BUMPER MOUNTED PLATE FOR AUXILIARY LIGHTS

(76) Inventor: Gregory James Wallace, Jackson, WY (US)

( * ) Notice: Subject to any disclaimer, the term of this patent is extended or adjusted under 35 U.S.C. 154(b) by 38 days.

(21) Appl. No.: 13/154,033

(22) Filed: Jun. 6, 2011

(65) Prior Publication Data

US 2012/0305719 A1    Dec. 6, 2012

(51) Int. Cl.
*B60R 19/03*    (2006.01)
*B60Q 1/56*    (2006.01)

(52) U.S. Cl.
USPC ............ 293/117; 293/105; 293/155; 362/497

(58) Field of Classification Search
USPC .......... 293/117, 155, 132, 102, 133; 296/191, 296/193.09, 203.02, 187.01; 29/897.2, 29/525.01, 460
See application file for complete search history.

(56) References Cited

U.S. PATENT DOCUMENTS

| | | | |
|---|---|---|---|
| 1,738,985 A | 12/1929 | Cammann | |
| 2,269,822 A | 1/1942 | Kowalsky | |
| 4,058,720 A | 11/1977 | Renfrow | |
| 4,204,701 A * | 5/1980 | Oltrogge | 280/491.5 |
| 4,213,644 A * | 7/1980 | Scrivo et al. | 362/505 |
| 4,310,872 A | 1/1982 | Lauve | |
| 4,466,646 A * | 8/1984 | Delmastro et al. | 293/117 |
| 4,667,995 A | 5/1987 | Wilkins | |
| 4,798,409 A * | 1/1989 | Miller | 293/117 |
| 4,955,577 A | 9/1990 | Ching | |
| 5,010,456 A | 4/1991 | Reichman | |
| D317,428 S * | 6/1991 | Carr | D12/222 |
| 5,060,122 A | 10/1991 | Miyoshi | |
| 5,066,057 A * | 11/1991 | Furuta et al. | 293/121 |
| 5,195,816 A | 3/1993 | Moss | |
| D343,605 S * | 1/1994 | Meryman | D12/169 |
| 5,727,865 A | 3/1998 | Caldwell | |
| 5,788,363 A | 8/1998 | Kamaya | |
| 5,798,691 A | 8/1998 | Tim | |
| 5,845,983 A | 12/1998 | Schmidt | |
| 6,238,070 B1 | 5/2001 | Gaelliner | |
| 6,264,354 B1 | 7/2001 | Motilal | |
| 6,357,707 B1 * | 3/2002 | Lindsay | 248/226.11 |
| 6,561,686 B1 | 5/2003 | Neubauer | |
| 6,923,564 B2 | 8/2005 | Steward | |
| 7,278,666 B2 * | 10/2007 | Hohendorn | 293/102 |
| 7,338,192 B2 | 3/2008 | Kreutzberg | |
| 7,607,723 B2 * | 10/2009 | Bierjon et al. | 296/203.02 |
| 7,988,225 B2 * | 8/2011 | Goldsberry | 296/193.09 |
| 2002/0044450 A1 | 4/2002 | Oh | |
| 2002/0044452 A1 | 4/2002 | Wang | |
| 2009/0243340 A1 * | 10/2009 | Goldsberry | 296/191 |

* cited by examiner

*Primary Examiner* — Glenn Dayoan
*Assistant Examiner* — Sunsurraye Westbrook
(74) *Attorney, Agent, or Firm* — Steffen Soller; Soller Law, P.L.L.C.

(57) ABSTRACT

A bumper mounting plate secures auxiliary lamps to an upper surface of a vehicle bumper. The bumper mounted plate assembly including a plate adapted to be secured to a bumper of a vehicle, a plurality of mounting holes placed on the back side of the plate, a plurality of orifices placed on the front side of the plate, the orifices are adapted to secure at least one auxiliary lamp to the plate, a first set of fastening devices to secure the plate to the bumper, and a second set of fastening devices to secure the auxiliary lamp to the plate.

9 Claims, 2 Drawing Sheets

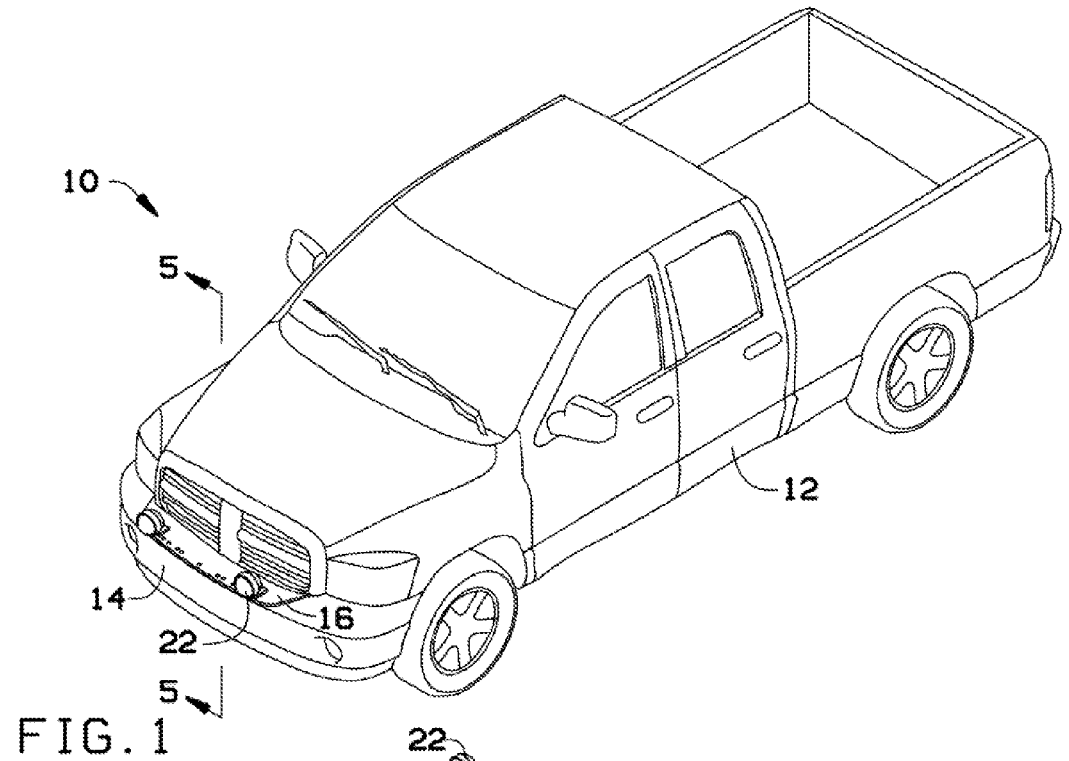
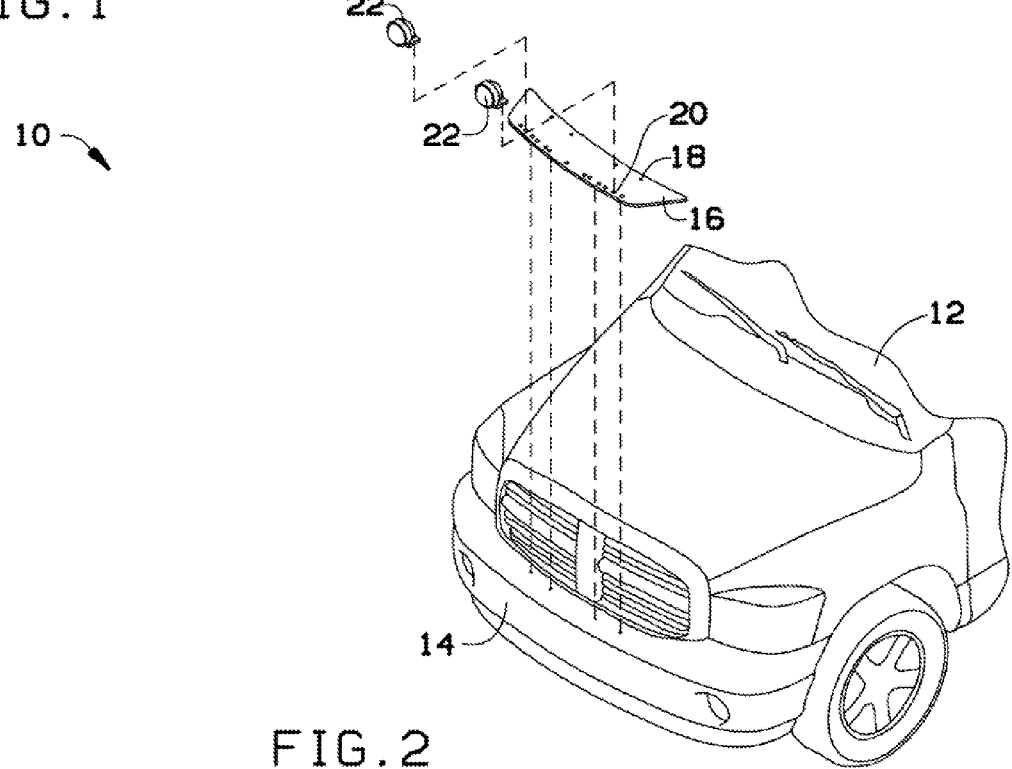

BUMPER MOUNTED PLATE FOR AUXILIARY LIGHTS

BACKGROUND OF THE INVENTION

The present invention generally relates to a lamp mounting plate. More particularly, the present invention relates to a lamp mounting plate assembly for securing auxiliary lamps to an upper surface of a vehicle bumper.

It is commonly known to place auxiliary lamps on vehicles to enhance driver visibility in fog, rain, snow, or dust. Although auxiliary lamps can be mounted on different locations throughout the vehicle, they are usually mounted underneath the front bumper. Unfortunately, mounting the auxiliary lamps underneath the front bumper reduces the illumination range, because the auxiliary lamps are too close to the ground. Furthermore, auxiliary lamps positioned underneath the bumpers are vulnerable to damage from raised objects.

As can be seen, there is a need to provide a device to mount auxiliary lamps on the front of the vehicle to enhance the driver's visibility and provide some protection to the auxiliary lamps.

SUMMARY OF THE INVENTION

In one aspect of the present invention, a bumper mounted plate assembly including a plate adapted to be secured to a bumper of a vehicle, a plurality of mounting holes placed on the back side of the plate, a plurality of orifices placed on the front side of the plate, the orifices are adapted to secure at least one auxiliary lamp to the plate, a first set of fastening devices to secure the plate to the bumper, and a second set of fastening devices to secure the auxiliary lamp to the plate.

In another aspect of the present invention, a method for securing auxiliary lamps to a bumper of a vehicle includes the steps of: aligning mounting holes located on a plate with the original equipment manufacturer's holes on the bumper, securing the plate to the bumper by passing a fastener device through the mounting holes and the original equipment manufacturer's holes, and securing at least one auxiliary lamp to orifices located on the plate.

These and other features, aspects and advantages of the present invention will become better understood with reference to the following drawings, description and claims.

BRIEF DESCRIPTION OF THE DRAWINGS

FIG. 1 illustrates a perspective view of a bumper mounted plate for auxiliary lamps according to an exemplary embodiment of the present invention showing the bumper mounted plate being used on a vehicle;

FIG. 2 illustrates an exploded view of the bumper mounted plate of FIG. 1;

DETAILED DESCRIPTION OF THE INVENTION

Figure 3:
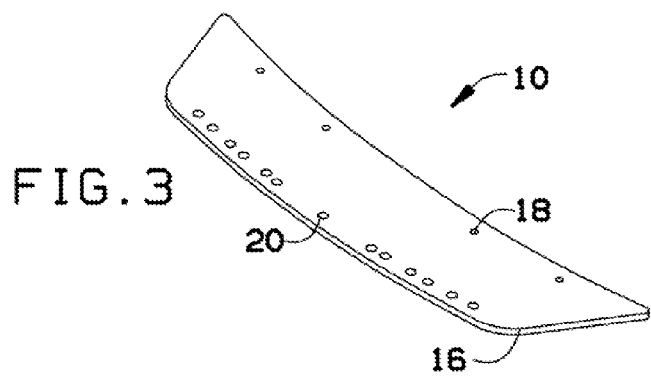
FIG. 3 illustrates a perspective front view of the mounted plate of FIG. 1.
Figure 4:
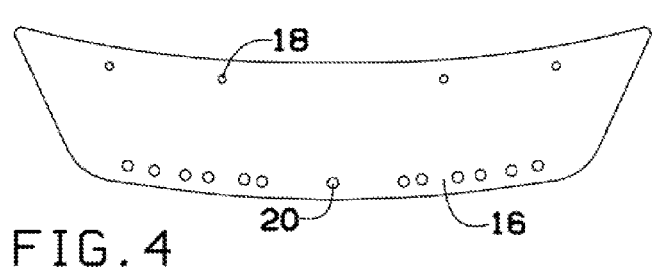
FIG. 4 illustrates a perspective top view of the mounted plate of FIG. 1.
Figure 5:
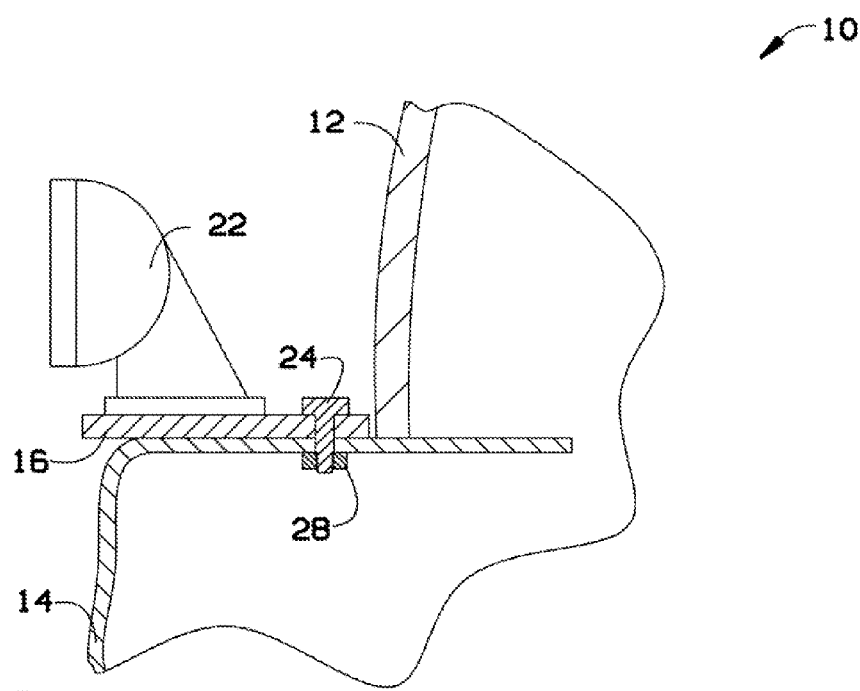
FIG. 5 illustrates a cross-sectional view of the mounted plate taken along line 5-5 of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a bumper mounting plate for securing auxiliary lamps to an upper surface of a vehicle bumper.

FIG. 1 illustrates a bumper mounted plate assembly 10 for auxiliary lamps 22 according to an exemplary embodiment of the present invention. The bumper mounted plate assembly 10 may be secured to a front bumper 14 of a vehicle 12. The bumper mounted plate assembly 10 may include a plate 16 adapted to be secured to the front bumper 14.

The plate 16 may be made of a non-corrosive material. In some embodiments, the plate 16 may be made of stainless steel, chrome, plastic, or non-corrosive metals. The plate 16 may be a one piece plate. The plate 16 may have a front side having edges that may match the edges of the front side of the bumper 14 of the vehicle 12. The back side of the plate 16 may include edges that are parallel to the corresponding edges of the front side. The plate 16 may be flat. The size and thickness of the plate 16 may depend on the size of the front bumper 14. In some embodiments, the thickness of the plate 16 may be between $\frac{1}{4}$ and $\frac{3}{8}$ inch. In some embodiments, the length of the plate 16 may be between 32 and 37 inches. In some embodiments, the width of the plate 16 may be between 9 and 10 inches. The size of the plate 16 may match the shape of the front bumper 14. The plate 16 may be made by machinery, molding, or injection molding.

A plurality of mounting holes 18 may be placed near the back side of the plate 16. The plurality of mounting holes 18 may be distributed through the plate 16 to specifically align with the original equipment manufacturer's holes (OEM holes—not shown) located on the upper surface of the front bumper 14. The size of the mounting holes 18 may depend on the size of the OEM holes (not shown). In some embodiments, the mounting holes 18 may have a diameter of $\frac{3}{8}$ inch. The number of mounting holes 18 may depend on the number of OEM holes (not shown). In some embodiments, the plate 16 may have four mounting holes 18.

The plate 16 may be secured to the front bumper 14 by using a fastening system 24, 28. The fastening system 24, 28 may be a bolt and nut fastening system.

A plurality of orifices 20 may be placed near each side on the front side of the plate 16. The plurality of orifices 20 may allow the user to secure the auxiliary lamps 22 to the plate 16. The auxiliary lamps 22 may be secured to the plate 16 by using a commercially available fastener (not shown). The fastener (not shown) may be a bolt and nut fastening system. The orifices 20 may have a diameter between $\frac{7}{16}$ and $\frac{1}{2}$ inches. The number of orifices 20 may depend on the number of auxiliary lamps 22 to be installed. In some embodiments, the plate 16 may have up to, but not limited to, 7 orifices placed near each side on the front side of the plate 16.

The bumper mounted plate 10 may serve as a platform upon which the auxiliary lamps 22 may be mounted in varying configurations depending on the size and diameter of the auxiliary lamps 22. The bumper mounted plate 10 may be easy to install. In addition, the bumper mounted plate 10 may allow the user to accommodate many different arrangements and configurations of auxiliary lamps 22.

The user may remove the protective cover (not shown) on the upper surface of the front bumper 14. Then, the user may place the plate 16 over the upper surface of the front bumper 14. The user may securely align the mounting holes 18 with the OEM holes (not shown) on the front bumper 14. Then, the user may secure the auxiliary lamps 22 to the plate 16 by using a fastening means.

The bumper mounted plate 10 may be customized to specifically fit a vehicle make and model. The bumper mounted plate 10 may be mounted on the rear bumper of the vehicle. Furthermore, the bumper mounted plate 10 may be directly attached to the body of the vehicle.

An antenna may be secured to one of the orifices 28 of the plate 16.

It should be understood, of course, that the foregoing relates to exemplary embodiments of the invention and that modifications may be made without departing from the spirit and scope of the invention as set forth in the following claims.

What is claimed is:

1. A bumper mounted plate assembly comprising:
    a plate adapted to be secured to a bumper of a vehicle, the plate including a front side and a back side;
    a plurality of mounting holes placed on the back side of the plate, wherein the plurality of mounting holes are distributed through the plate to specifically align with the original equipment manufacturer's holes on the bumper;
    a plurality of orifices placed on the front side of the plate, the orifices are adapted to secure at least one auxiliary lamp to the plate, wherein the plurality of mounting holes and the plurality of orifices are located in the same horizontal plane;
    a first set of fastening devices to secure the plate to the top side of the bumper; and
    a second set of fastening devices to secure the auxiliary lamp to the plate.

2. The bumper mounted plate assembly according to claim 1, wherein the plate is a one piece plate.

3. The bumper mounted plate assembly according to claim 1, wherein the front side of the plate includes edges that match edges of a front side of the bumper.

4. The bumper mounted plate assembly according to claim 1, wherein the plate is flat.

5. A method for securing auxiliary lamps to a bumper of a vehicle, the method comprising the steps of:
    aligning mounting holes located on a plate with the original equipment manufacturer's holes on the bumper;
    securing the plate to the top side of the bumper by passing a fastener device through the mounting holes and the original equipment manufacturer's holes;
    and securing at least one auxiliary lamp to orifices located on the plate, wherein the orifices are located on the same horizontal plane as the mounting holes.

6. The method according to claim 5, wherein the plate is a one piece plate.

7. The method according to claim 5, wherein passing a fastener device through the mounting holes comprises passing a fastener device vertically through the mounting holes.

8. The method according to claim 5, wherein the orifices and mounting holes are parallel to each other.

9. A bumper mounted plate assembly comprising:
    a flat plate adapted to be secured to a top side of a bumper of a 2002-2010 Dodge Ram Truck, the flat plate including a front side and a back side;
    a plurality of horizontal mounting holes placed on the back side of the flat plate;
    a plurality of horizontal orifices placed on the front side of the flat plate, the orifices are adapted to secure at least one auxiliary lamp to the flat plate, wherein the orifices are located on the same horizontal plane as the mounting holes;
    a first set of fastening devices to secure the flat plate to the top side of the bumper; and
    a second set of fastening devices to secure the auxiliary lamp to the flat plate.

* * * * *